March 21, 1972 P. E. BERGHAUSEN ET AL 3,650,923
METHOD AND DEVICE FOR DETECTING CONTACT BETWEEN TOOL
AND WORKPIECE OF AN ECM APPARATUS
Filed Sept. 19, 1968

INVENTORS.
PHILIP E. BERGHAUSEN
GARETH A. DEHNER
JOHN M. MORGAN, JR.

BY *Frank C. Leach jr.*

ATTORNEY.

United States Patent Office 3,650,923
Patented Mar. 21, 1972

3,650,923
METHOD AND DEVICE FOR DETECTING CONTACT BETWEEN TOOL AND WORKPIECE OF AN ECM APPARATUS
Philip E. Berghausen, Gareth A. Dehner, and John M. Morgan, Jr., Cincinnati, Ohio, assignors to Cincinnati Milacron Inc., Cincinnati, Ohio
Filed Sept. 19, 1968, Ser. No. 760,783
Int. Cl. B23p 1/00
U.S. Cl. 204—143 M
13 Claims

ABSTRACT OF THE DISCLOSURE

A low AC voltage is applied between a tool and a workpiece of an ECM apparatus. The voltage drop between the tool and the workpiece decreases when contact occurs between the tool and the workpiece. This change in the voltage drop is sensed to indicate that there is contact. If there is contact, the DC power supply cannot be activated. The device also may be utilized to form a selected size gap between the tool and the workpiece by moving the tool and the workpiece apart the selected distance after contact has been indicated.

---

In electrochemical machining (ECM), it is necessary to know that there is no contact between the electrode and the workpiece at the time that the DC power supply is supplied. Otherwise, the tool and/or the workpiece will be damaged by the high current of the DC power supply at the point of contact.

If there is no electrolyte in the gap between the tool and the workpiece, determination as to whether there is contact may be easily accomplished by measuring the resistance of the gap since the resistance is very high prior to contact and very low after contact. However, if the gap is filled with an electrolyte, this large differential in the resistance of the gap does not exist since the resistance of the gap is low before contact and very low after contact.

Since the forming of a cavity, for example, in a workpiece results in the electrolyte remaining in the gap so that the gap cannot remain dry after the electrolyte has been supplied thereto, a satisfactory detecting device must be able to sense when contact exists between the tool and the workpiece irrespective of the presence of an electrolyte in the gap. Accordingly, the measurement of the two substantially different resistances, which exist when there is no electrolyte in the gap, cannot be utilized when an electrolyte is in the gap.

In order to be able to distinguish between the low resistance of the gap, which contains an electrolyte, before contact of the tool and the workpiece and the very low gap resistance after contact of the tool and the workpiece, it is necessary to supply a current of sufficient magnitude between the tool and the workpiece so that the voltage drop between the tool and the workpiece before and after contact may be distinguished. While the very high current of the DC power supply such as 20,000 amps, for example, would enable the two voltage drops to be readily distinguishable, this high current will damage the tool and/or the workpiece irrespective of whether there is contact between the tool and the workpiece. If there is contact, the tool and the workpiece will be damaged by the high current density at the point of contact since there would not be contact over the entire area of the tool and the workpiece but only at the point of contact. If the tool and the workpiece are not in contact, the high current will damage the workpiece by producing undesired electrochemical machining. Therefore, the current of the DC power supply cannot be employed.

The difference in the materials of the tool and the workpiece produces an electrolytic voltage, which is DC. Since this electrolytic voltage may cancel any voltage drop created by the resistance of the gap due to a direct current of relatively small magnitude flowing therethrough, there is no way in which a true measurement of the voltage drop across the gap may be obtained when utilizing direct current and not damage the tool and/or the workpiece.

The present invention satisfactorily solves the foregoing problems by providing a device capable of sensing the difference in the resistance of the gap with an electrolyte therein when the tool and the workpiece are in contact and when the tool and the workpiece are not in contact. The present invention employs a relatively low AC voltage with a sufficiently small current so that there will not be any damage to the tool and/or the workpiece. By maintaining the voltage relatively low, no spark will be created by the tool and the workpiece when they contact to cause damage to the tool and/or the workpiece. By maintaining the current relatively small, an oxide coating, which tends to form on the surface of the tool and the workpiece when the AC voltage is relatively high, will not be created.

Accordingly, the present invention permits the operator of an ECM apparatus to be able to supply power only if there is no contact between the tool and the workpiece. Furthermore, the present invention allows the operator to select a specific size gap between the tool and the workpiece by determining when contact occurs and automatically stop feeding of the tool and the workpiece toward each other at that time; then, the tool and the workpiece are retracted from each other to produce the desired gap.

This setting of the size of the gap is particularly useful where the tool and the workpiece are enclosed in a manifold or the like. This arrangement prevents the operator from seeing the distance between the tool and the workpiece or from checking the gap size with a feeler gauge.

If the areas of the tool and the workpiece become relatively large, the resistance of the gap becomes smaller because the resistance is inversely proportional to the area of the gap. Accordingly, as the gap area increases, the difference in the resistance before and after contact with an electrolyte in the gap becomes even more difficult to distinguish. The present invention solves this problem by increasing the bias of an amplifier, which is used in the device, when the gap area increases.

An object of this invention is to provide a method and device for sensing when a tool and a workpiece of an ECM apparatus contact.

Another object of this invention is to provide a method and device for producing a selected size gap between a tool and a workpiece for an ECM apparatus.

Other objects of this invention will be readily perceived from the following description, claims, and drawing.

This invention relates to a device for detecting whether a tool and a workpiece of an ECM apparatus are engaging. The device comprises means to apply an AC voltage between the tool and the workpiece with means to sense the voltage drop between the tool and the workpiece. The device has means responsive to the magnitude of the sensed voltage drop to indicate the relation of the tool and the workpiece to each other.

This invention also relates to a device for indicating whether a tool and a workpiece of an ECM apparatus are in contact. The device comprises means to check the relation of the tool and the workpiece to each other, means to initiate supply of DC power to the tool and the workpiece, and means to cause relative movement of the tool and the workpiece to each other. The device has means, which is responsive to the check means, to control activation of the supply means and inactivation of the causing means. Switch means causes one of the supply means and the causing means to be effective and controlled by the control means and renders the other of the supply means and the causing means ineffective.

This invention further relates to a method of controlling initiation of a DC power supply between a tool and a workpiece of an ECM apparatus. The method includes applying a relatively low AC voltage between the tool and the workpiece and sensing the voltage drop between the tool and the workpiece. The DC power is applied between the tool and the workpiece only when the sensed AC voltage drop is greater than a value that indicates contact between the tool and the workpiece.

This invention still further relates to a method of setting a gap of a selected size between a tool and a workpiece of an ECM apparatus. The method includes producing relative movement of the tool and the workpiece toward each other and stopping the relative movement of the tool and the workpiece toward each other upon sensing that the tool and the workpiece contact. Then, relative movement of the tool and the workpiece away from each other for the selected distance is produced after the tool and the workpiece have contacted.

The attached drawing illustrates a preferred embodiment of the invention, in which.

Figure 2:
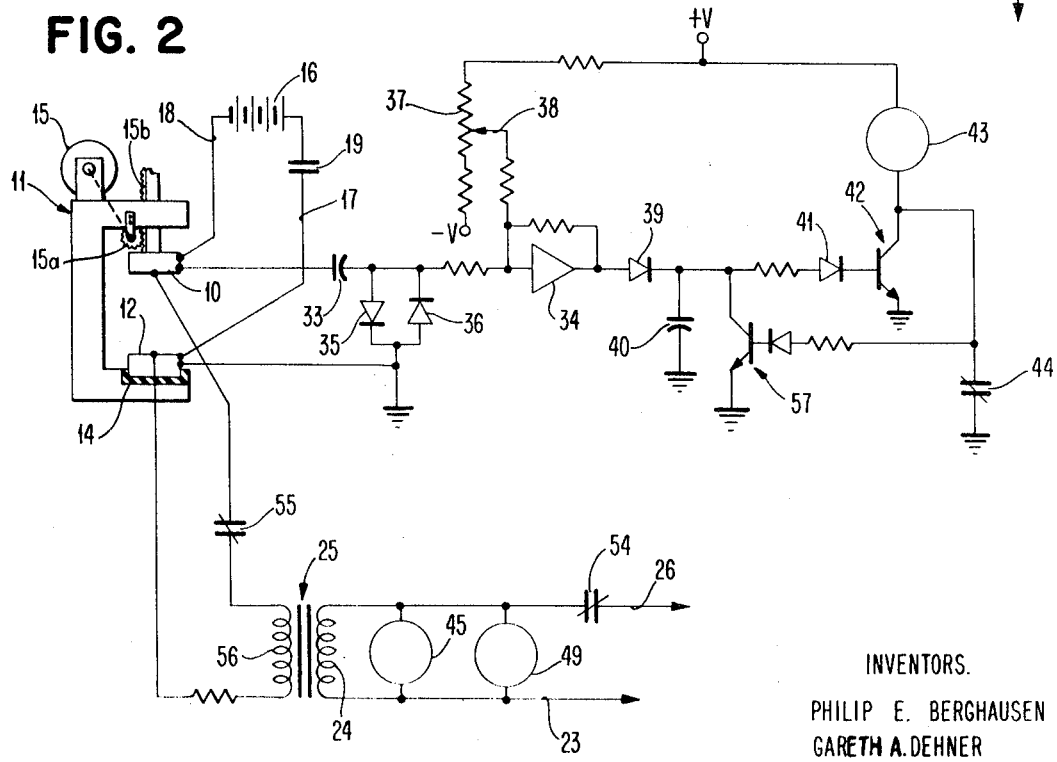
FIG. 2 is a schematic wiring diagram of the circuit for sensing the voltage drop between a tool and a workpiece of an ECM apparatus.

Referring to the drawing and particularly FIG. 2, there is shown a tool 10, which is supported by a frame 11, and a workpiece 12, which also is supported by the frame 11. The workpiece 12 is insulated from the frame 11 by suitable insulating material 14. If desired, the tool 10 also could be insulated from the frame 11.

The tool 10 is movable toward and away from the workpiece 12 by suitable feed means such as a motor 15, which is supported on the frame 11, driving a gear 15a, which is supported on the frame 11, that meshes with a rack 15b on the tool 10. Thus, relative movement between the tool 10 and the workpiece 12 toward and away from each other is accomplished through the feed means. If desired, the workpiece 12 could be movable by feed means rather than the tool 10.

A DC power supply 16 such as a battery, for example, has its positive side connected through a lead 17 to the workpiece 12 while its negative side is connected to the tool 10 through a lead 18. The lead 17 has normally open contacts 19 therein; the contacts 19 must be closed before the DC power supply 16 may be applied between the workpiece 12 and the tool 10 to produce electrochemical machining of the workpiece 12. It should be understood that a suitable electrolyte is supplied to the gap between the tool 10 and the workpiece 12.

The contacts 19 can be closed only when a relay 20 (see FIG. 1) is picked. This can occur only when the tool 10 and the workpiece 12 are not in contact with each other as determined by the sensing or detecting system of the present invention.

The sensing or detecting system of the present invention includes an AC power source 21 having supply leads 22 and 23 connected thereto. The AC voltage of the source 21 is transformed by a transformer 25 to an AC voltage of relatively low voltage so that no sparking will occur when the tool 10 and the workpiece 12 contact. For example, the transformer 25 may supply 2½ volts at 20 amps. The current is sufficient to permit the difference in the voltage drops across the tool 10 and the workpiece 12 to be sensed while not forming an undesired oxide coating on the surface of the tool 10 or the workpiece 12.

The lead 23 is directly connected to one side of a primary winding 24 of the transformer 25, which transmits the AC voltage of the source 21 to the tool 10 and the workpiece 12. The winding 24 of the transformer 25 has its other lead 26 connected to the lead 22 of the AC source 21 by a switch arm 27 of a switch, which includes switch arms 28 and 29 movable with the switch arm 27. When the switch arm 27 is in the position of FIG. 1, the switch arm 27 is connected to the lead 22 through a lead 30, which has a stop push button 31 and a start push button 32 therein.

Figure 1:
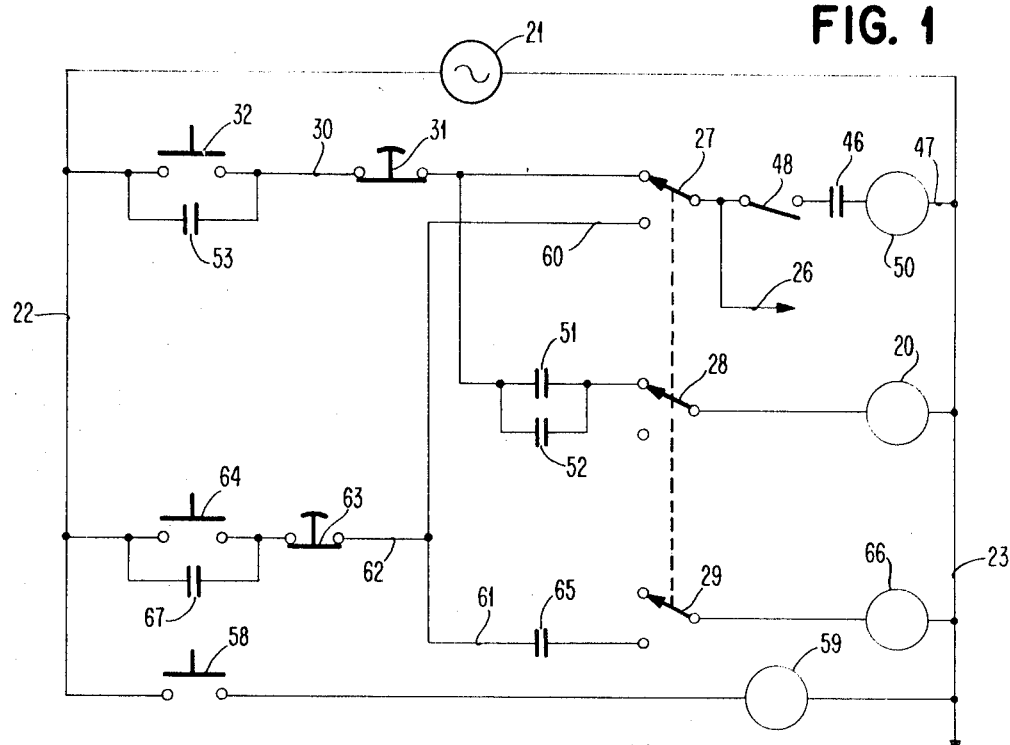
FIG. 1 is a schematic wiring diagram of a portion of the present invention.

The position of the switch arm 27 in FIG. 1 is the position when it is desired to control the DC power supply 16 so that it will be turned on only when there is no contact between the tool 10 and the workpiece 12. Accordingly, when the start push button 32 is moved to a closed position to cause starting of the ECM process, the AC source 21 is connected to the winding 24 of the transformer 25 to supply an AC voltage across the gap between the tool 10 and the workpiece 12. Thus, an AC voltage is supplied across the gap to determine the resistance of the gap by measuring the voltage drop between the tool 10 and the workpiece 12. As previously mentioned, a lower resistance exists when the tool 10 and the workpiece 12 engage so that a smaller voltage drop exists when there is contact than when there is no contact between the tool 10 and the workpiece 12.

The voltage drop between the tool 10 and the workpiece 12 is supplied through a capacitor 33 to an amplifier 34. The capacitor 33 prevents any DC voltage from being supplied to the amplifier 34 due to either the DC power supply 16 when it is on or electrolytic action between the dissimilar materials of the tool 10 and the workpiece 12 immersed in the electrolyte.

A pair of diodes 35 and 36 is employed to limit the voltage supplied to the amplifier 34. Thus, the full amplitudes of the large voltage drops, which exist when there is no electrolyte in the gap and no contact between the tool 10 and the workpiece 12, are not supplied to the amplifier 34 but the amplitudes of these voltages are clipped.

The amplifier 34 also receives an input from a potentiometer 37, which has one end connected to a positive DC voltage, +V, and its other end connected to a negative DC voltage, —V. Accordingly, by positioning arm 38 of the potentiometer 37, the sensitivity of the amplifier 34 may be adjusted to provide an increased selectivity when the tool 10 and the workpiece 12 have relatively large areas. This increased selectivity is necessary to distinguish between the very small difference in voltage drops when the area of the gap is relatively large. To increase the selectivity of the amplifier 34, the arm 38 is moved towards the negative DC voltage, —V.

The output of the amplifier 34 is rectified by a diode 39 and filtered by a capacitor 40. The voltage is then supplied through a diode 41 to the base of an NPN transistor 42. The transistor 42 has its collector connected through the coil of a relay 43 to the positive voltage, +V, while its emitter is grounded.

Accordingly, the transistor 42 is designed to cooperate with the gain of the amplifier 34 so that the transistor 42 is turned on whenever the voltage drop across the gap indicates that the tool 10 and the workpiece 12 are not in contact. This is a larger voltage drop than when the tool 10 and the workpiece 12 are in contact. Accordingly, when there is no contact between the tool 10 and the workpiece 12, the turning on of the transistor 42 allows sufficient current to flow through the coil of the relay 43 to maintain the relay 43 picked.

The coil of the relay 43 is energized whenever positive voltage, +V, is supplied as long as normally closed contacts 44 of a relay 45 remain closed. Since the relay 45 is disposed in parallel with the winding 24 of the transformer 25, the relay 45 has current supplied to its coil as soon as the start push button 32 is closed. However, there is a slight time delay due to the mass of the relay 45 before it is picked after the AC source 21 is connected to the winding 24.

Accordingly, if there is no contact between the tool 10 and the workpiece 12, the transistor 42 is turned on before the normally closed contacts 44 of the relay 45 open due to the relay 45 being picked. As a result, the relay 43 remains energized if there is no contact between the tool 10 and the workpiece 12 when the push button 32 is closed.

When the relay 43 is picked, its normally open contacts 46 in a lead 47, which connects the switch arm 27 to the lead 23, are closed. However, until a contact 48 of a timer 49, which is connected in parallel with the winding 24 of the transformer 25 and the relay 45 as shown in FIG. 2, is closed, a relay 50 in the lead 47 cannot be picked. The timer 49 does not close the timer contact 48 until a predetermined time after the relay 45 is picked.

If the transistor 42 has been turned on due to the tool 10 and the workpiece 12 not contacting each other, the closing of the timer contact 48 results in the relay 50 being picked since the contacts 46 of the relay 43 remain closed due to the transistor 42 being turned on. Accordly, when the relay 50 is picked, its normally open contacts 51 close to complete a circuit through the relay 20. As a result, the relay 20 is picked to allow the contacts 19 in the lead 17 to be closed so that the DC power supply 16 may be applied between the tool 10 and the workpiece 12 to produce electrochemical machining. It should be understood that the contacts 19 are preferably controlled by a separate relay (not shown), which is energized due to the relay 20 being picked.

When the relay 20 is picked, it causes closing of its normally open contacts 52, which are disposed in parallel with the contacts 51, and its normally open contacts 53, which are disposed in parallel with the push button 32. Accordingly, when the relay 20 is picked, it provides its own hold circuit so that it is not necessary for the push button 32 to be held in a closed position or for the relay 50 to remain energized. This is necessary since it is desired to remove the AC voltage from between the tool 10 and the workpiece 12 when electrochemical machining occurs.

The AC voltage from the source 21 is removed from the tool 10 and the workpiece 12 through normally closed contacts 54 of the relay 20 in the lead 26 opening upon the relay 20 being picked. Additionally, normally closed contacts 55 of the relay 20 also are opened. The contacts 55 are in the circuit connecting secondary winding 56 of the transformer 25 to the tool 10 and prevent the voltage of the DC power supply 16 from burning up the winding 56.

Accordingly, when the power source 21 is disconnected from the transformer 25, the timer 49 is inactivated. As a result, the timer contact 48 opens to de-energize the relay 50. However, because of the contacts 52 of the relay 20 being closed, the inactivation of the relay 50 does not affect the hold circuit for the relay 20 so that the relay 20 remains energized to allow power to be supplied from the DC supply 16 until the push button 31 is opened by the operator to stop operation of the ECM process. When this occurs, the relay 20 is de-energized, and the contacts 19 are opened to disconnect the DC supply 16 from the tool 10 and the workpiece 12.

If the tool 10 and the workpiece 12 are in contact with each other when the start push button 32 is actuated, there will not be sufficient voltage supplied from the amplifier 34 to the base of the transistor 42 to turn it on. Accordingly, when the normally closed contacts 44 open due to the relay 45 being picked, the relay 43 is de-energized. However, there is still sufficient current through the coil of the relay 43 to turn on an NPN transistor 57, which has its base connected between the relay 43 and the contacts 44. Thus, the transistor 57 prevents the transistor 42 from ever conducting when the transistor 57 is turned on.

Since the relay 43 is de-energized, the closing of the timing contact 48 will not cause the relay 50 to be picked since the normally open contacts 46 of the relay 43 remain open. Thus, when the tool 10 and the workpiece 12 are in contact with each other, there can be no energization of the DC supply 16. In order to turn on the power supply 16, it is necessary to release the start push button 32 and then retract the tool 10 and the workpiece 12 from each other through actuation of a push button 58 to close a circuit through a relay 59 from the source 21. This picking of the relay 59 causes the feed means to reverse the movement of the tool 10 and move it away from the workpiece 12. Then, the push button 32 may again be actuated by the operator to determine if the tool 10 has been removed from contact with the workpiece 12.

When it is desired to utilize the invention for selecting the size of the gap between the tool 10 and the workpiece 12, it is necessary to automatically advance the tool 10 and the workpiece 12 relative to each other until they contact. Then, the tool 10 is moved away from the workpiece 12 by the feed means for the desired distance of the gap.

When the sensing or detecting system of the present invention is to be employed for selecting the size of the gap, the switch arms 27, 28, and 29 are moved downwardly from their positions of FIG. 1. Accordingly, the switch arm 27 engages a lead 60, and the switch arm 29 contacts a lead 61. The switch arm 28 is moved to an inactive position.

The leads 60 and 61 are connected through a lead 62, which has a stop push button 63 and a start push button 64 in series therein, to the lead 22. Accordingly, with the stop push button 63 in the position of FIG. 1, closing of the start push button 64 results in AC voltage being supplied from the source 21 to the winding 24 of the transformer 25.

If the tool 10 and the workpiece 12 are not in engagement with each other, the output of the amplifier 34 to the base of the transistor 42 turns on the transistor 42. As a result, when the timer contact 48 closes after the timer 49 has been actuated, the relay 50 is energized since the normally open contacts 46 of the relay 43 are closed due to the relay 43 being energized because the transistor 42 is conducting.

Accordingly, when the relay 50 is picked, normally open contacts 65 of the relay 50 in the lead 61 close whereby a feed relay 66 is picked. When this occurs, normally open contacts 67, which are in parallel with the start push button 64, of the relay 66 are closed. As a result, the feed start push button 64 may be released since a hold circuit for the relay 66 is supplied through the contacts 67.

When the relay 66 is picked, it causes the tool 10 to be moved toward the workpiece 12 by the feed means. Since the relay 20 is not actuated in this mode of operation because the switch arm 28 is in an inactive position, the contact 48 of the timer 49 remains closed so that the relay 50 remains picked as long as the relay 43 is picked due to the transistor 42 being turned on. Of course, the normally closed contacts 44 of the relay 45 opened shortly after the AC source 21 supplied voltage to the winding 24 of the transformer 25.

The feed means continues to be energized to move the tool 10 and the workpiece 12 toward each other through moving the tool 10 until contact is made between the tool 10 and the workpiece 12. At this time, the voltage drop across the gap decreases so that there is not sufficient voltage to maintain the transistor 42 in a conductive state. This causes the relay 43 to be de-energized whereby the relay 50 is de-energized since the contacts 46 of the relay 43 open. As soon as the relay 50 is de-energized, the contacts 65 of the relay 50 open to de-energize the relay 66 whereby the feed means is inactivated.

When the voltage drop across the gap falls so that the transistor 42 is turned off, the transistor 57 is turned on. Thus, no further activation of the transistor 42 is possible until another actuation of the push button 64 or the push button 32 occurs. It also would be necessary for there not to be contact between the tool 10 and the workpiece 12 in order for the transistor 42 to be turned on.

When the feed relay 66 is de-energized, the operator of the machine then retracts the tool 10 away from the workpiece 12 the desired distance to provide the selected size of the gap between the tool 10 and the workpiece 12. This retraction is accomplished by closing the push button 58 to pick the relay 59.

Considering the operation of the system of the present invention when it is desired to activate the DC power supply 16 to start the ECM process, the switch arms 27, 28, and 29 are disposed in the position of FIG. 1. When the push button 32 is activated, AC voltage from the source 21 is supplied to the winding 24 of the transformer 25. This applies an AC voltage between the tool 10 and the workpiece 12 through the secondary winding 56 of the transformer 25.

If there is no contact between the tool 10 and the workpiece 12, the voltage drop between the tool 10 and the workpiece 12 is sufficiently high to cause the transistor 42 to turn on. This maintains the relay 43 energized after the normally closed contacts 44 of the relay 45 open due to the relay 45 being picked shortly after the AC source 21 is connected to the winding 24 of the transformer 25.

With the relay 43 being picked through the transistor 42 being turned on, the normally open contacts 46 remain closed so that when the contact 48 is closed by the timer 49, the relay 50 will be picked whereby the normally open contacts 51 close to pick the relay 20. When the relay 20 is picked, the normally open contacts 19 are closed to allow the DC supply 16 to be applied between the tool 10 and the workpiece 12 to produce electrochemical machining of the workpiece 12. Since the contacts 53 of the relay 20 are closed when the relay 20 is energized, it is not necessary to hold the push button 32 in a closed position after the DC power supply 16 begins to supply a voltage across the machining gap.

When the relay 20 is picked, the normally open contacts 54 in the lead 26 are opened. This results in no AC voltage being supplied from the source 21 to the winding 24 of the transformer 25. At the same time, the normally closed contacts 55 of the relay 20 open the circuit of the secondary winding 56. Thus, the AC source 21 is disconnected from the tool 10 and the workpiece 12 when electrochemical machining of the workpiece 12 is to occur.

If the tool 10 and the workpiece 12 should be in contact with each other when the push button 32 is actuated, then the transistor 57 will be turned on whereby the transistor 42 cannot conduct. Since the transistor 42 is not turned on when the normally closed contacts 44 open, the relay 43 drops out and cannot again be activated until the push button 32 is released and again started. Of course, the tool 10 should be moved away from the workpiece 12 before actuation of the push button 32 again occurs.

If the device is to be used to select a desired size gap between the tool 10 and the workpiece 12, the switch arms 27, 28, and 29 are moved downwardly from the position of FIG. 1. Then, the push button 64 is actuated to supply AC voltage from the source 21 to the transformer 25. Since it will be assumed that the tool 10 and the workpiece 12 are not in contact at this time, the transistor 42 is turned on whereby the relay 50 will be picked as soon as the contact 48 of the timer 49 closes. This results in the normally open contacts 65 of the relay 50 closing whereby the relay 66 is picked. This causes the tool 10 to be fed towards the workpiece 12 by the feed means. The operator releases the push button 64 as soon as feeding of the tool 10 commences. This is because the normally open contacts 67 of the relay 66 are closed when the relay 66 is picked to form a hold circuit for the relay 66.

When the tool 10 is moved into engagement with the workpiece 12, the transistor 42 is turned off because of the decrease in the voltage drop between the tool 10 and the workpiece 12. As a result, the relay 50 is de-energized so that the contacts 65 return to their open position. This causes the relay 66 to be de-energized whereby the feed means is inactivated.

When this occurs, the operator of the machine may then move the tool 10 away from the workpiece 12 the desired distance. This is accomplished by actuating the push button 58 to pick the relay 59 and cause the feed means to retract the tool 10 away from the workpiece 12.

An advantage of this invention is that it is independent of the tool size, the electrolyte composition and concentration, and the material of the workpiece. Another advantage of this invention is that it permits a gap of a selected size to be formed between the tool and the workpiece of an ECM apparatus.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

What is claimed is:

1. A method of controlling initiation of a DC power supply between a tool and a workpiece of an ECM apparatus including:
   applying a relatively low AC voltage between the tool and the workpiece with the DC power supply inactivated;
   sensing the voltage drop between the tool and the workpiece produced by the applied AC voltage;
   and applying the DC power supply between the tool and the workpiece only when the sensed AC voltage drop is greater than a value that indicates conductive contact between the tool and the workpiece.

2. A method of setting a gap of a selected size between a tool and a workpiece of an ECM apparatus in the absence of any machining including:
   applying a relatively low AC voltage between the tool and the workpiece with the DC power supply inactivated;
   producing relative movement of the tool and the workpiece toward each other with the DC power supply inactivated so that machining is not occurring and with the AC voltage applied;
   stopping relative movement of the tool and the workpiece toward each other upon electrically sensing that the tool and the workpiece conductively contact with the DC power supply inactivated and the AC voltage applied;
   and producing relative movement of the tool and the workpiece away from each other for the selected distance after the tool and the workpiece have conductively contacted.

3. An ECM apparatus for machining a workpiece by a tool including a DC power supply for supplying DC power to the tool and the workpiece, means to produce relative movement between the tool and the workpiece, and a device for detecting whether the tool and the workpiece are in conductive contact with the DC power supply inactivated and in the absence of any machining, said device comprising:
   means to determine the relation of the tool and the workpiece to each other with the DC power supply inactivated;
   means to initiate supply of DC power from the DC power supply to the tool and the workpiece;
   means to cause relative movement of the tool and the workpiece toward each other by said producing means;
   means responsive to said determining means to control activation of said initiating means and inactivation of said causing means;
   and switch means to cause either of said initiating means and said causing means to be selectively effective and controlled by said control means and render the other of said initiating means and said causing means ineffective when one of said initiating means and said causing means is effective.

4. An ECM apparatus for machining a workpiece by a tool including a DC power supply for supplying DC power to the tool and the workpiece, means to initiate the supply of DC power from the DC power supply to the tool and the workpiece, means to produce relative movement between the tool and the workpiece, and a device for detecting whether the tool and the workpiece are in conductive contact with the DC power supply inactivated and in the absence of any machining, said device comprising:
means to apply a relatively low AC voltage between the tool and the workpiece with the DC power supply inactivated;
means to sense only the voltage drop between the tool and the workpiece produced by the applied AC voltage;
and means responsive to the magnitude of the sensed voltage drop to indicate the relation of the tool and the workpiece to each other.

5. The apparatus according to claim 4 including means to limit the voltage received by said responsive means in the absence of an electrolyte between the tool and the workpiece.

6. The apparatus according to claim 4 in which said responsive means includes means to control initiation of the supply of DC power from the DC power supply to the tool and the workpiece by said initiating means, said control means preventing initiation of the supply of DC power to the tool and the workpiece when said responsive means indicates that the tool and the workpiece are in conductive contact.

7. The apparatus according to claim 6 including means to automatically inactivate said voltage applying means when said responsive means indicates that the tool and the workpiece are not in conductive contact.

8. The apparatus according to claim 6 in which said applying means includes:
an AC voltage source;
a transformer having:
a primary winding connected to said source; and
a secondary winding connected to the tool and the workpiece;
and means to disconnect at least said secondary winding of said transformer when said responsive means indicates that the tool and the workpiece are not in conductive contact.

9. The apparatus according to claim 4 in which said responsive means includes means to inactivate said producing means when the tool and the workpiece conductively contact each other.

10. The apparatus according to claim 9 including means to automatically inactivate said voltage applying means when said responsive means indicates that the tool and the workpiece are in conductive contact.

11. The apparatus according to claim 4 including:
means to cause relative movement of the tool and the workpiece toward each other by said producing means;
switch means to allow only one of said initiating means and said causing means to be effective;
and said responsive means including means to control the one of said initiating means and said causing means rendered effective by said switching means;
said control means activating said initiating means only if said responsive means indicates that the tool and the workpiece are not in conductive contact and inactivating said causing means only when said responsive means indicates that the tool and the workpiece are in conductive contact.

12. The apparatus according to claim 11 including means to automatically inactivate said voltage applying means when said control means activates said initiating means or inactivates said causing means.

13. The apparatus according to claim 12 in which said applying means includes:
an AC voltage source;
a transformer having:
a primary winding connected to said source;
and a secondary winding connected to the tool and the workpiece;
and means to disconnect at least said secondary winding of said transformer when said control means activates said initiating means.

References Cited
UNITED STATES PATENTS

| | | | |
|---|---|---|---|
| 3,275,538 | 9/1966 | Haupt et al. | 204—224 |
| 3,288,693 | 11/1966 | Livshits | 204—224 |
| 3,328,279 | 6/1967 | Williams et al. | 204—224 |
| 3,332,864 | 7/1967 | Woods | 204—224 |
| 3,357,912 | 12/1967 | Inoue | 204—224 |
| 3,448,024 | 6/1969 | Philpott | 204—225 |
| 3,520,791 | 7/1970 | Pfau et al. | 204—228 |
| 3,533,927 | 10/1970 | Manning | 204—143 M |
| 3,548,257 | 12/1970 | Drushel et al. | 204—143 M |
| 3,524,804 | 8/1970 | Gotz | 204—228 |

JOHN H. MACK, Primary Examiner

S. S. KANTER, Assistant Examiner

U.S. Cl. X.R.
204—224, 225, 228